Figure 1:
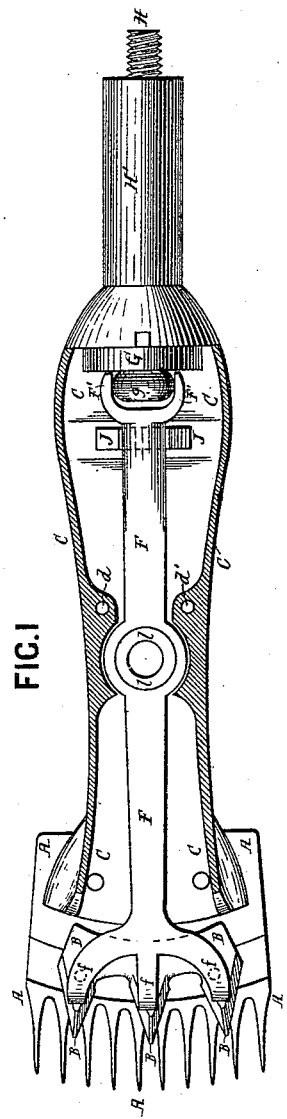

(No Model.) 2 Sheets—Sheet 1.

J. HOWARD & J. H. GEDDES.
MACHINE FOR CLIPPING WOOL.

No. 471,425. Patented Mar. 22, 1892.

Witnesses:
E. B. Bolton
David R. Smith, Jr.

Inventors.
John Howard
John Henry Geddes
By Richards
their Attorneys.

(No Model.) 2 Sheets—Sheet 2.
J. HOWARD & J. H. GEDDES.
MACHINE FOR CLIPPING WOOL.
No. 471,425. Patented Mar. 22, 1892.
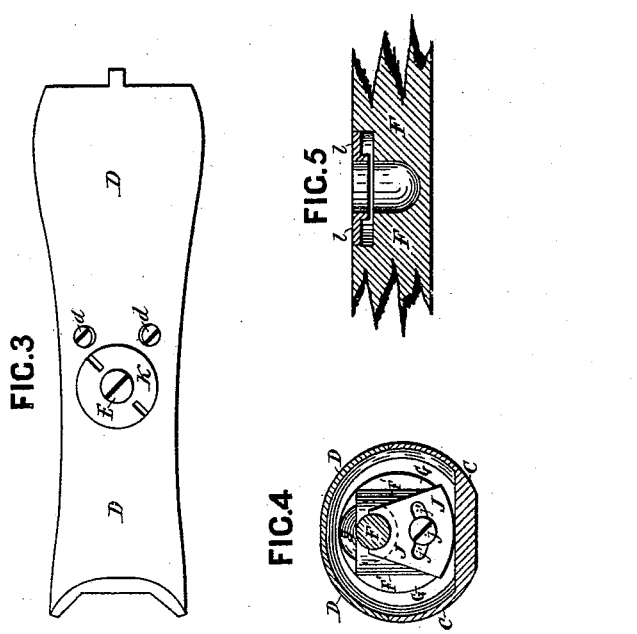
Witnesses:
E. R. Bolton
Davis R. Smith, Jr.
Inventors:
John Howard
John Henry Geddes
By Richards
their Attorneys.

UNITED STATES PATENT OFFICE.

JOHN HOWARD AND JOHN H. GEDDES, OF SYDNEY, NEW SOUTH WALES.

MACHINE FOR CLIPPING WOOL.

SPECIFICATION forming part of Letters Patent No. 471,425, dated March 22, 1892.

Application filed March 18, 1890. Serial No. 344,305. (No model.)

*To all whom it may concern:*

Be it known that we, JOHN HOWARD and JOHN HENRY GEDDES, subjects of the Queen of Great Britain, and residents of Sydney, in the Colony of New South Wales, have invented certain Improvements in Machine Sheep-Shears, of which the following is a specification.

The machine or apparatus that forms the subject of the present application for Letters Patent consists of a comb and cutter of the ordinary type. The cutter is operated by gear that is contained within the handle of the machine. The comb is firmly secured to the underneath of the handle that forms the case containing the operating-gear. The upper side of the handle forming the case is so constructed as to be capable of being readily removed and will form a cover to the operating-gear. The under side of the central portion of the cover is formed into a solid boss that is bored and tapped to receive an adjustable pivot pin or fulcrum. The rear end of the handle or case tapers away into a sleeve, which constitutes a bearing for the driving-shaft. The end of the driving shaft or spindle that enters the handle or casing is formed into a crank, (preferably a disk crank,) the crank-pin of which forms the axis of an anti-friction roller, whose function will be hereinafter referred to. The cutter is operated by means of a lever of the first class, the forward end of which is formed into a three-pronged fork, the outer prongs of the fork being provided on their under sides with studs that fit into corresponding holes formed in the cutter. The first-class lever is vibrated on the before-mentioned adjustable pivot pin or fulcrum that is tapped into the boss formed on the cover. The lower extremity of the adjustable pivot-pin or fulcrum is bulb-shaped or spherical and fits into a corresponding recess or socket formed in the upper side of the first-class-lever. This recess or socket, which is of peculiar construction, will be hereinafter more fully described. The rear end of the first-class lever is forked, the sides of the fork forming two vertical cheeks between which the anti-friction roller on the crank-pin is free to move vertically. The rear end of the first-class lever is carried and supported by a segment of a roller or rocker, the periphery of which rocks on a race formed on the bottom of the casing. The segmental roller or rocker is connected to the lever and held in position by means of a set-screw that passes through a slot in the segmental roller.

Figure 2:
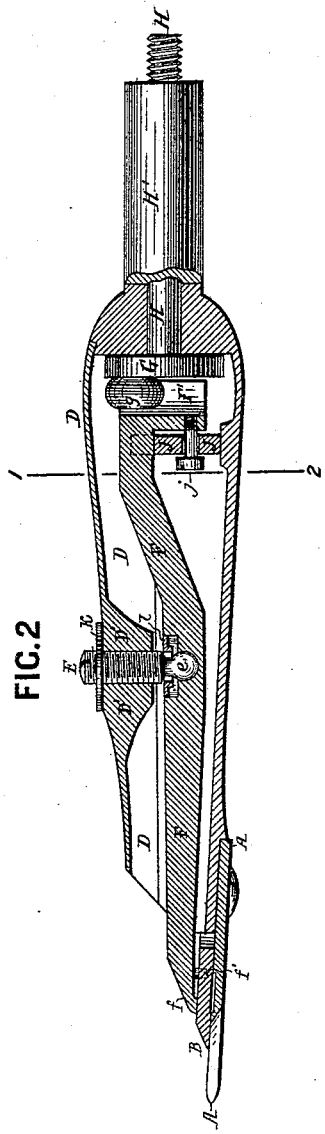

In the accompanying drawings, Figure 1 is a plan of the working parts of the apparatus, the cover being removed. Fig. 2 is a longitudinal section, the fulcrum-pin, driving-spindle, and crank being in elevation. Fig. 3 is a plan view of the cover only. Fig. 4 is a cross-section on the line 1 2 of Fig. 2, particularly showing the segmental roller and race and the attaching-screw. Fig. 5 is a detail sectional view, on an enlarged scale, of the socket in the first-class lever that receives the spherical end of the fulcrum or pivot pin.

A is the comb; B, the cutter; C, the under side of the casing; D, the cover of the casing; D', the tapped boss that carries the fulcrum-pin E.

The first-class lever F vibrates on the bulbed head $e$ of the fulcrum-pin E. The forward end of the lever F is forked at $f f f$, the under sides of the outer prongs of the fork being provided with studs $f' f'$ fitting into holes formed on the cutter B. (See Fig. 2.) The rear end of the lever F is forked, the sides F' F' of the fork constituting cheeks, between which the roller $g$ on the crank-disk G is free to move vertically.

The crank-disk G is carried at the extreme end of the driving-spindle H, the outer extremity of which is connected to any suitable driving-gear.

The rear end of the casing or handle of the apparatus is tapered away and forms a sleeve H', that consitutes a bearing for the driving-spindle H.

In Figs. 2 and 4 may be seen the segmental roller or rocker J, that supports and carries the rear end of the lever F. The function of this rocker is somewhat peculiar. It will be seen by referring to Fig. 2 that the lever F is supported at both ends, the cutter B supporting it at the forward end and the rocker J at the rear end.

The rocker J is constructed of such a form as to permit the lever F to vibrate in a perfectly horizontal plane, (see Fig. 4,) while at the same time the friction is reduced to a minimum. The rocker J is secured to the lever F by a set-screw $j$, that passes through the segmental slot $j'$ in the rocker J. This segmental slot $j'$, with which engages the screw $j$, permits of the sidewise rocking of the rocker, which at the same time is prevented from displacement by said screw.

It has already been mentioned that the lever F is supported at both ends and vibrates on the fulcrum-pin E, placed about midway between its two extremities. The fulcrum-pin E is specially made adjustable for the purpose of regulating the pressure or tension upon the cutter B. To this end the boss D' on the cover is tapped and the fulcrum-pin E screwed into it, so that the downward pressure of the fulcrum-pin on the lever F may be adjusted to the greatest nicety. When the desired pressure or tension has been obtained, the pivot or fulcrum pin E is secured by means of a lock-nut K. (See Figs. 2 and 3.) The socket in the lever F that receives the pivot-pin E is shown in enlarged view in Fig. 5. The socket and the bulbed end of the pivot or fulcrum pin will together constitute a ball-and-socket joint that will allow a limited amount of play in any direction to the lever F, and will thus compensate for uneven wear on the cutter B and permit of a perfect adjustment of the tension. An annular recess is formed on the upper side of the lever F around the socket to serve as a receptacle for a lubricant. The lubricant is prevented from escaping from the recess by an undercut annular cap $l$, that is fitted into the recess. (See Fig. 5.) It will be seen that no matter in what position the machine is placed it will be impossible for the lubricant to escape from the lubricating-chamber, but will be retained within the chamber by the cap $l$. The cover D is secured to the casing C by the two screws $d\ d'$. (See Figs. 1 and 3.)

Having now particularly described and ascertained the nature of our said invention and in what manner the same is to be performed, we declare that what we claim is—

1. In a sheep-shearing machine, the combination, with the cutter B and lever F, of adjustable screw-threaded fulcrum or pivot pin E, having a bulbed end $e$, adapted to form a ball-and-socket joint, substantially as set forth.

2. In a sheep-shearing machine, the combination, with the casing, the cutter B, and lever F, provided with a socket, of an adjustable screw-threaded pivot-pin seated in said socket and having a bulbed end adapted to enter and work in said socket in lever F and form a ball-and-socket joint, and lock-nut K for securing the permanency of any amount of tension on said cutter, substantially as set forth.

3. In a shearing-machine, the combination, with lever F, of segmental roller J, supporting and carrying the rear end of lever F and provided with slot $j'$, and screw $j$, engaging said slot, whereby lever F shall always reciprocate in one horizontal plane, substantially as set forth.

4. In a sheep-shearing machine, the combination, with the lever F, provided with a socket and an annular recess, of an undercut annular cap fitting over said recess, whereby lubricating material may be retained, substantially as set forth.

In witness whereof we have hereunto set our hands in presence of two witnesses.

JOHN HOWARD.
JOHN H. GEDDES.

Witnesses:
 MANFIELD NEWTON, C. E.
 PERCEVAL NEWTON.